(12) United States Patent
Tung et al.

(10) Patent No.: US 9,575,925 B2
(45) Date of Patent: Feb. 21, 2017

(54) RACK SERVER SYSTEM AND AUTO-ADDRESSING METHOD THEREOF

(71) Applicant: Quanta Computer Inc., Tao Yuan Shien (TW)

(72) Inventors: Yen-Ping Tung, New Taipei (TW); Li-Tsung Chen, Tao Yuan Shien (TW)

(73) Assignee: QUANTA COMPUTER INC., Taoyuan (TW)

( * ) Notice: Subject to any disclaimer, the term of this patent is extended or adjusted under 35 U.S.C. 154(b) by 462 days.

(21) Appl. No.: 14/196,427

(22) Filed: Mar. 4, 2014

(65) Prior Publication Data

US 2015/0199289 A1 Jul. 16, 2015

(30) Foreign Application Priority Data

Jan. 16, 2014 (TW) .............................. 103101635 A

(51) Int. Cl.
*G06F 13/40* (2006.01)
*G06F 13/42* (2006.01)

(52) U.S. Cl.
CPC ................................ *G06F 13/4291* (2013.01)

(58) Field of Classification Search
CPC .... G06F 13/409; G06F 13/00; G06F 13/3022; G06F 13/387; G06F 13/385; G06F 13/4022
See application file for complete search history.

(56) References Cited

U.S. PATENT DOCUMENTS

| 6,021,459 A * | 2/2000 | Norman | ............... G06F 12/0661 365/230.03 |
| 6,745,270 B1 * | 6/2004 | Barenys | ............... G06F 13/4291 710/104 |
| 2015/0177813 A1 * | 6/2015 | Bailey | .................... G06F 1/3234 713/320 |

* cited by examiner

*Primary Examiner* — Farley Abad
(74) *Attorney, Agent, or Firm* — Nixon Peabody LLP

(57) ABSTRACT

A rack server system and an auto-addressing method thereof are disclosed. The rack server system comprises a plurality of backplanes and a rack management controller (RMC). The backplanes comprise a plurality of inter-integrated circuit (I2C) switches. The RMC comprises an I2C channel connected to the backplanes. When the RMC initializes the backplanes, the RMC controls a plurality of reset signals to be an enable level to reset the I2C switches, and automatically addresses a plurality of different I2C device addresses to the I2C switches. The RMC changes the reset signals to be a disable level from the enable level after the RMC addressed the I2C switches.

12 Claims, 3 Drawing Sheets

RACK SERVER SYSTEM AND AUTO-ADDRESSING METHOD THEREOF

This application claims the benefit of Taiwan application Serial No. 103101635, filed Jan. 16, 2014, the subject matter of which is incorporated herein by reference.

BACKGROUND OF THE INVENTION

Field of the Invention

The invention relates in general to a computer, and more particularly to a rack server system and an auto-addressing method thereof.

Description of the Related Art

The rack server adopts high density node configuration, centralized power supply unit (PSU) management and heat dissipation system, and is further equipped with a rack management controller (RMC). The user can log on the RMC through a remote network connection to monitor the state of the rack server, such as the state of the nodes, the state of fan control, the state of PSU and the state of rack power consumption. The RMC and the backplanes are connected through an RJ45 signal line. The RMC monitors the temperature and rotation speed of the fan through the I2C device disposed on the backplanes and further communicates with the nodes through the intelligent platform management bus (IPMB). Examples of the I2C device are such as super input/output (super I/O) controllers, I/O expanders, and so on.

The rack server has limited space and can only accommodate 4 backplanes to the maximum. A backplane connects 10 nodes. Each backplane is connected to an I2C channel of the RMC by using an independent I2C bus because the address of each device on the I2C bus is unique and cannot be repeated. When the backplanes are serviced, the power supply to the 10 nodes on the backplanes will be interrupted which is very inconvenient and inflexible.

SUMMARY OF THE INVENTION

The invention is directed to a rack server system and an auto-addressing method thereof.

According to one embodiment of the present invention, a rack server system is disclosed. The rack server system comprises a plurality of backplanes and a rack management controller (RMC). The backplanes comprise a plurality of inter-integrated circuit (I2C) switches. The RMC comprises an I2C channel connected to the backplanes. When the RMC initializes the backplanes, the RMC controls a plurality of reset signals to be an enable level to reset the I2C switches, and automatically addresses a plurality of different I2C device addresses to the I2C switches. The RMC changes the reset signal to be a disable level from the enable level after the RMC addressed the I2C switches.

According to another embodiment of the present invention, an auto-addressing method of a rack server system is disclosed. The rack server system comprises a plurality of backplanes and a rack management controller (RMC). The backplanes comprise a plurality of inter-integrated circuit (I2C) switches. The RMC comprises an I2C channel connecting the backplanes and the RMC. The I2C channel is connected to the backplanes. The auto-addressing method comprises: controlling a plurality of reset signals to be an enable level by the RMC to reset the I2C switches when the RMC initializes the backplanes; addressing a plurality of different I2C device addresses to the I2C switches; and changing the reset signals to be a disable level after the I2C switches are addressed.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
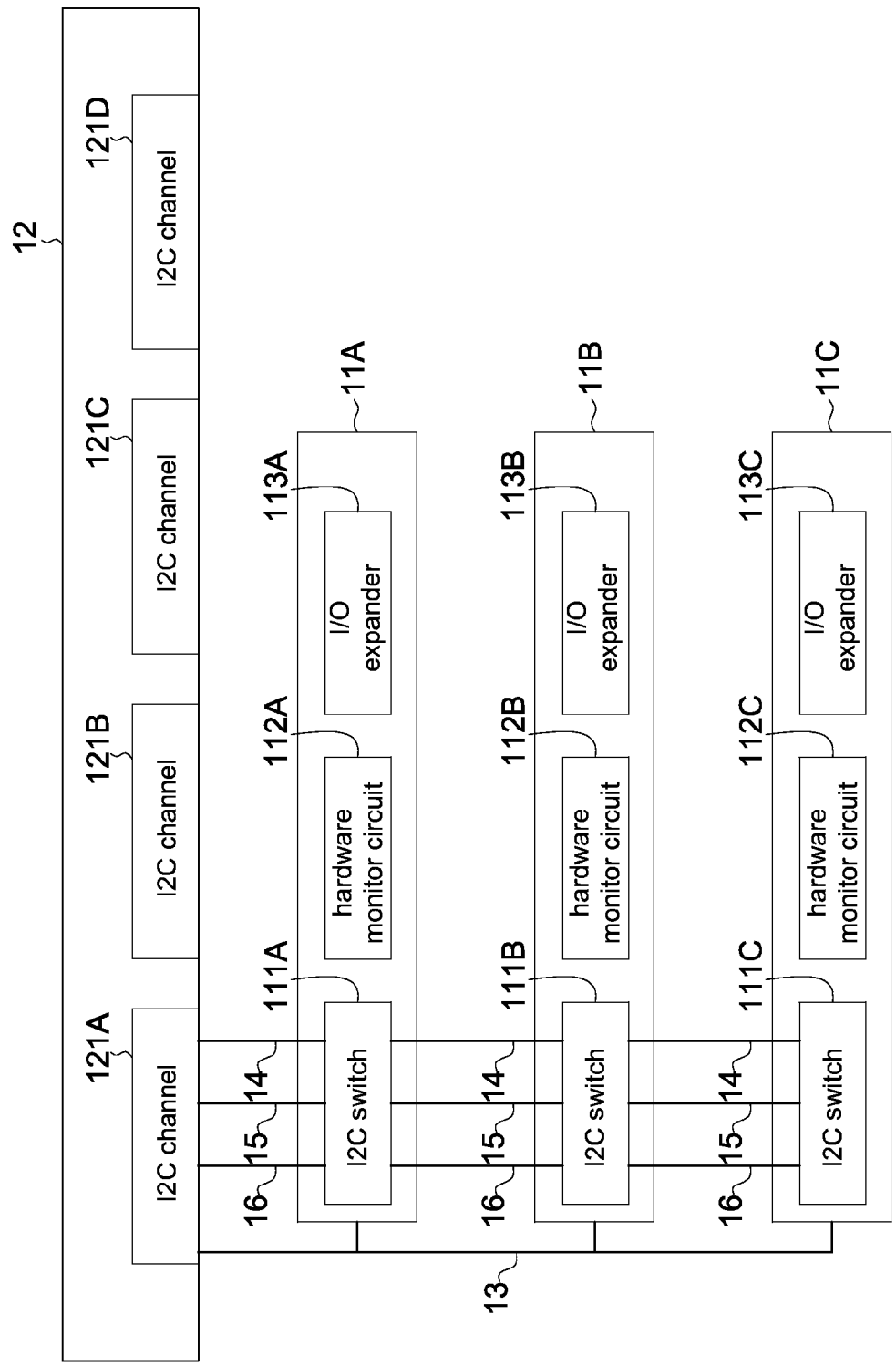
FIG. 1 is a circuit diagram of a rack server system according to an embodiment.
Figure 2:
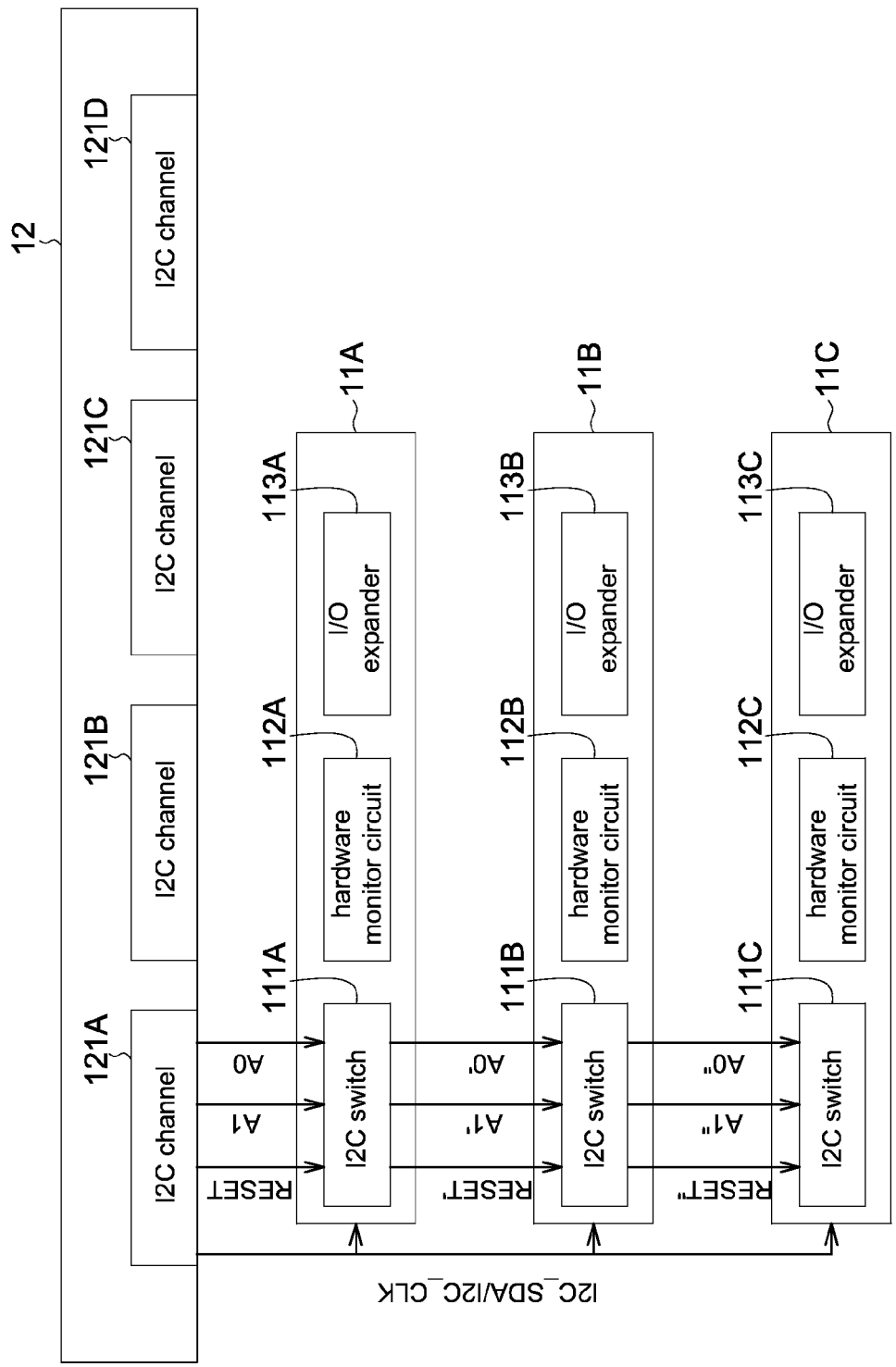
FIG. 2 is a signal transmission diagram of a rack server system according to an embodiment.

Referring to FIG. 1 and FIG. 2. FIG. 1 is a circuit diagram of a rack server system according to an embodiment. FIG. 2 is a signal transmission diagram of a rack server system according to an embodiment. The rack server system 1 comprises a plurality of backplanes 11A, 11B and 11C, a rack management controller (RMC) 12, an I2C bus 13, address lines 14 and 15 and a reset signal line 16. The backplanes 11A comprises an I2C switch 111A, a hardware monitor circuit 112A and an I/O expander 113A, wherein the hardware monitor circuit 112A and the I/O expander 113A communicate with the RMC 12 through the I2C switch 111A. The backplane 11B comprises an I2C switch 111B, a hardware monitor circuit 112B and an I/O expander 113B, wherein the hardware monitor circuit 112B and the I/O expander 113B communicate with the RMC 12 through the I2C switch 111B. The backplane 11C comprises an I2C switch 111C, a hardware monitor circuit 112C and an I/O expander 113C, wherein the hardware monitor circuit 112C and the I/O expander 113C communicate with the RMC 12 through the I2C switch 111C.

The RMC 12 comprises I2C channels 121A, 121B, 121C and 121D. The I2C channel 121A is connected to the backplanes 11A, 11B and 11C. The I2C bus 13 transmits I2C data I2C_SDA or I2C clock pulse I2C_CLK between the backplanes 11A, 11B and 11C and the RMC 12.

The address lines 14 and 15 transmit the I2C device address A1A0 to the I2C switch 111A, and transmit the I2C device address A1'A0' to the I2C switch 111B. The address lines 14 and 15 transmit the I2C device address A1"A0" to the I2C switch 111C. The I2C device address A1A0 is such as $00_{(2)}$; the I2C device address A1'A0' is such as $01_{(2)}$; and the I2C device address A1"A0" is such as $10_{(2)}$. The address lines 14 and 15 can address 4 I2C switch devices. The reset signal line 16 transmits the reset signal RESET to the I2C switch 111A. The reset signal line 16 transmits the reset signal RESET' to the I2C switch 111B. The reset signal line 16 transmits the reset signal RESET" to the I2C switch 111C.

When the RMC 12 initializes the backplanes 11A, 11B, and 11C, the RMC 12 controls reset signals RESET, RESET' and RESET" to be an enable level to reset the I2C switches 111A, 111B and 111C, and automatically addresses different I2C device addresses A1A0, A1'A0' and A1"A0" to the backplanes 11A, 11B, and 11C. After the addressing process is completed, the RMC 12 changes the reset signals RESET, RESET' and RESET" to a disable level from the enable level. Furthermore, after the RMC 12 addressed the backplanes 11A, the reset signals RESET is changed to a disable level from the enable level. Then, the RMC 12 addresses the backplane 11B, and after the addressing process is completed, the RMC 12 changes the reset signal RESET' to a disable level from the enable level. Then, the RMC 12 addresses the backplane 11C, and after the addressing process is completed, the RMC 12 changes the reset signal RESET" to a disable level from the enable level. In other words, once the RMC 12 finishes addressing a backplane, the RMC 12 disables the resetting of the backplane.

Figure 3:
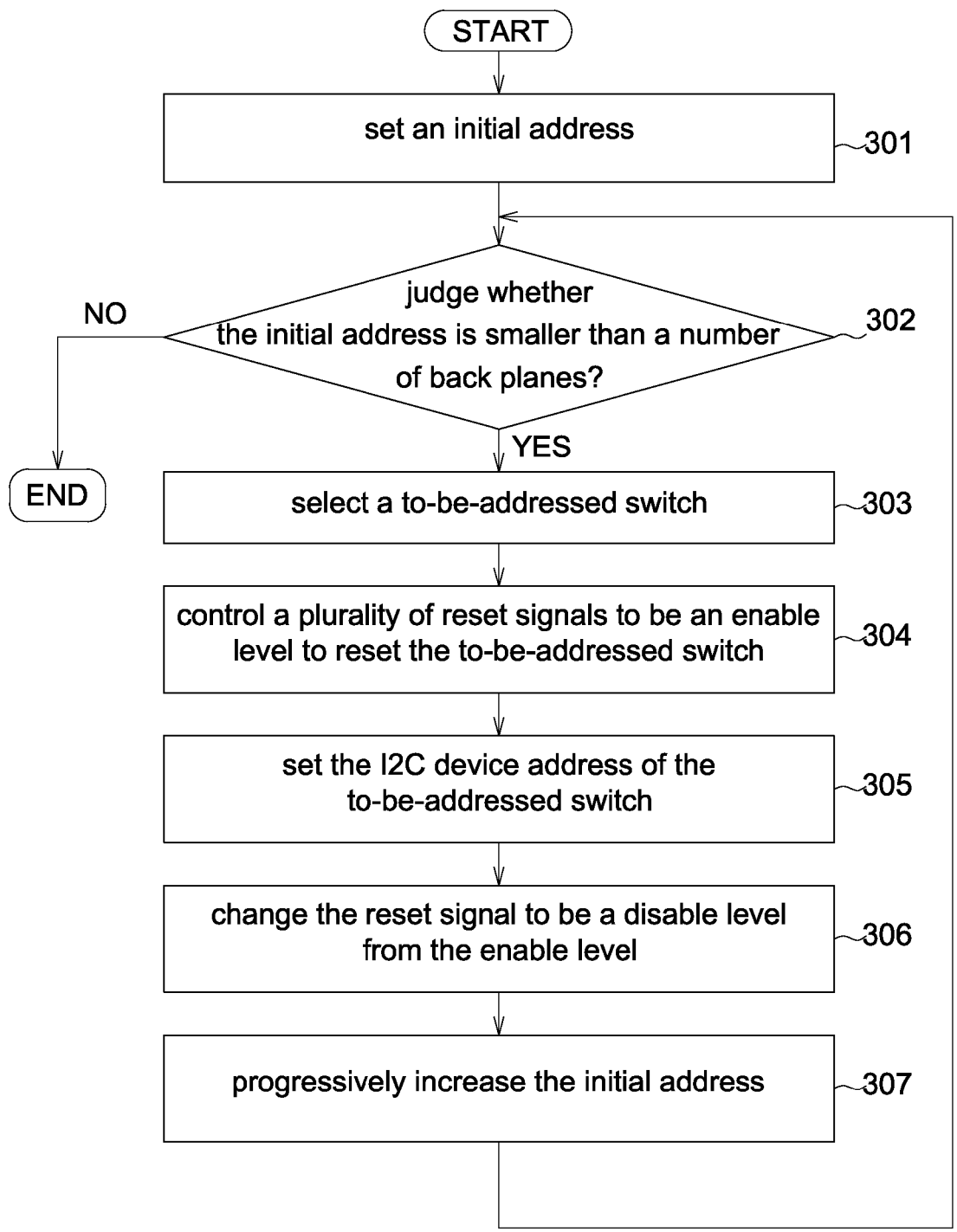
FIG. 3 is a flowchart of an auto-addressing method according to an embodiment.

Refer to FIG. 2 and FIG. 3. FIG. 3 is a flowchart of an auto-addressing method according to an embodiment. The auto-addressing method can be used in the disclosed rack server system 1, and comprises following steps. Firstly, the method begins at step 301, the RMC 12 sets an initial address. For example, the initial address is set to be 0. Then, the method proceeds to step 302, the RMC 12 judges whether the initial address is smaller than a number of backplanes. If the initial address is smaller than the number of backplanes, then the method executes step 303. Conversely, if the initial address is not smaller than the number of backplane, then the auto-addressing method terminates. In the present embodiment, the number of backplane is exemplified by 3. In step 303, the RMC 12 selects one from the I2C switches 111A, I 111B and 111C as a to-be-addressed switch.

Then, the method proceeds to step 304, the RMC 12 controls a plurality of reset signals to be an enable level to reset the to-be-addressed switch. In step 302, if the RMC 12 selects the I2C switch 111A as a to-be-addressed switch, then the RMC 12 controls the reset signal RESET to an enable level to reset the I2C switch 111A.

Then, the method proceeds to step 305, the RMC 12 sets the I2C device address of the to-be-addressed switch according to the initial address. In step 302, if the RMC 12 selects the I2C switch 111A as a to-be-addressed switch, then in step 305, the RMC 12 sets the I2C device address A1A0 of the I2C switch 111A to be $00_{(2)}$.

Then, the method proceeds to step 306, the RMC 12 changes the reset signal to be a disable level from the enable level. In step 302, if the RMC 12 selects the I2C switch 111A as a to-be-addressed switch, then in step 306, the RMC 12 changes the reset signal RESET to a disable level from the enable level. Then, the method proceeds to step 307, the RMC 12 progressively increases the initial address, for example, the initial address is progressively increased to $01_{(2)}$ from $00_{(2)}$.

Then, the method proceeds to step 302, the RMC 12 judges whether the initial address $01_{(2)}$ is smaller than a number of backplanes. Since the initial address $01_{(2)}$ is smaller than the number of backplanes, the method proceeds to step 303. In step 303, the RMC 12 selects the I2C switch 111B as a to-be-addressed switch. Then, the method proceeds to step 304, the RMC 12 controls the reset signal RESET' to an enable level to reset the I2C switch 111B. Then, the method proceeds to step 305, the RMC 12 resets the I2C device address A1'A0' of the I2C switch 111B to be $01_{(2)}$. Then, the method proceeds to step 306, the RMC 12 changes the reset signal RESET' to a disable level from the enable level. Then, the method proceeds to step 307, the RMC 12 progressively increases the initial address to $10_{(2)}$ from $01_{(2)}$.

Then, the method proceeds to step 302, the RMC 12 judges whether the initial address $10_{(2)}$ is smaller than a number of backplanes. Since the initial address $10_{(2)}$ is smaller than the number of backplane, the method proceeds to step 303. In step 303, the RMC 12 selects the I2C switch 111C as a to-be-addressed switch. Then, the method proceeds to step 304, the RMC 12 controls the reset signal RESET" to an enable level to reset the I2C switch 111C. Then, the method proceeds to step 305, the RMC 12 resets the I2C device address A1"A0" of the I2C switch 111B to be equal to $10_{(2)}$. Then, the method proceeds to step 306, the RMC 12 changes the reset signal RESET' to a disable level from the enable level. Then, the method proceeds to step 307, the RMC 12 progressively increases the initial address to $11_{(2)}$ from $10_{(2)}$. Then, the method proceeds to step 302, the RMC 12 judges whether the initial address $11_{(2)}$ is smaller than a number of backplanes. Since initial address $11_{(2)}$ is not smaller than the number of backplane, the auto-addressing method terminates.

To summarize, in the disclosed auto-addressing method, when the backplanes 11A, 11B, and 11C are initialized, the RMC 12 controls the reset signals RESET, RESET' and RESET" to an enable level to reset the I2C switches 111A, 111B and 111C, and automatically addresses different I2C device addresses A1A0, A'A0' and A1"A0" to the backplanes 11A, 11B, and 11C. After the RMC 12 addressed the backplanes 11A, 11B, and 11C, the RMC 12 changes the reset signals RESET, RESET' and RESET" to a disable level from the enable level.

The rack server system and the auto-addressing method thereof disclosed in above embodiment are capable of automatically addressing a plurality of backplanes connected to one single I2C channel for providing more flexible and convenient application. For example, the backplane 11A connects 4 nodes, the backplane 11B connects 4 nodes, and the backplane 11C connects 2 nodes. When the backplane 11A is being serviced, the rack server system still normally provides power to the 4 nodes connected by the backplane 11B and the 2 nodes connected by the backplane 110 to avoid the power supply to the 10 nodes being interrupted at the same time and causing inconvenience.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rack server system, comprising:
   a plurality of backplanes, comprising:
   a plurality of I2C switches; and
   a rack management controller (RMC), comprising:
   an I2C channel connected to the backplanes via an I2C bus, a plurality of address lines, and a reset line,
   wherein when the RMC initializes the backplanes, the RMC controls a plurality of reset signals via the reset line to be an enable level to reset the I2C switches and automatically addresses a plurality of different I2C device addresses to the I2C switches via the plurality of address lines, and, after the RMC addresses the I2C switches, the RMC changes the reset signals to be a disable level from the enable level.

2. The rack server system according to claim 1, where the I2C bus is configured for transmitting data or a clock pulse between the backplanes and the RMC.

3. The rack server system according to claim 1, wherein the RMC is configured to automatically address the plurality of different I2C device addresses by performing steps comprising:

selecting an initial address to yield a selected address;
determining whether the selected address is smaller than the number of backplanes; and
in response to determining the selected address is smaller than the number of backplanes, assigning the selected address to an unaddressed one of the plurality of I2C switches.

4. The rack server system according to claim 3, wherein the assigning comprises:
controlling the plurality of reset signals to be the enable level for the unaddressed one of the plurality of I2C switches;
setting the unaddressed one of the plurality of I2C switches to the selected address; and
changing the reset signal to be the disable level for the unaddressed one of the plurality of I2C switches.

5. The rack server system according to claim 3, wherein the RMC is further configured to automatically address the plurality of different I2C device addresses by performing further steps comprising:
increment the selected address; and
repeating the determining and assigning.

6. An auto-addressing method of a rack server system, wherein the rack server system comprises a plurality of backplanes and a rack management controller (RMC), the plurality of backplanes comprise a plurality of I2C switches, the RMC comprises an I2C channel connecting the backplanes and the RMC, the I2C channel is connected to the backplanes via an I2C bus, a plurality of address lines, and a reset line, and the auto-addressing method comprises performing, via the RMC, the steps of:
selecting an initial address to yield a selected address;
determining whether the selected address is smaller than the number of backplanes; and
in response to determining the selected address is smaller than the number of backplanes, assigning the selected address to an unaddressed one of the plurality of I2C switches.

7. The auto-addressing method according to claim 6, wherein the assigning comprises:
controlling the plurality of reset signals to be the enable level for the unaddressed one of the plurality of I2C switches;
setting the unaddressed one of the plurality of I2C switches to the selected address; and
changing the reset signal to be the disable level for the unaddressed one of the plurality of I2C switches.

8. The auto-addressing method according to claim 6, wherein the RMC is further configured to automatically address the plurality of different I2C device addresses by performing further steps comprising:
increment the selected address; and
repeating the determining and assigning.

9. An auto-addressing method of a rack server system, wherein the rack server system comprises a plurality of backplanes and a rack management controller (RMC), the plurality of backplanes comprise a plurality of I2C switches, the RMC comprises an I2C channel connecting the backplanes and the RMC, the I2C channel is connected to the backplanes via an I2C bus, a plurality of address lines, and a reset line, and the auto-addressing method comprises performing, via the RMC, the steps of:
controlling a plurality of reset signals on the reset line to be an enable level to reset the I2C switches when initializing the backplanes;
automatically addressing the I2C switches to a plurality of different I2C device addresses using the plurality of address lines; and
changing the reset signals on the reset line to a disable level after the I2C switches are addressed.

10. The auto-addressing method according to claim 9, wherein the rack server system further comprises:
an I2C bus for transmitting data or clock pulse between the backplanes and the RMC.

11. The auto-addressing method according to claim 10, wherein the rack server system further comprises:
a plurality of address lines for transmitting the I2C device addresses to the I2C switches.

12. The auto-addressing method according to claim 11, wherein the rack server system further comprises:
a reset signal line for transmitting the reset signals to the I2C switches.

* * * * *